(12) United States Patent
Lobisser et al.

(10) Patent No.: US 10,919,656 B1
(45) Date of Patent: Feb. 16, 2021

(54) PROCEDURES FOR OPERATING A VACUUM TO STORE PERISHABLES BY CONTROLLING PRESSURE AND OXYGEN LEVELS INDEPENDENT OF EACH OTHER AS WELL AS SETTING FLOOR AND CEILING OPERATING PARAMETERS

(71) Applicant: RIPELOCKER LLC, Bainbridge Island, WA (US)

(72) Inventors: George Frank Lobisser, Bainbridge Island, WA (US); G. Kyle Lobisser, Bainbridge Island, WA (US); Todd Hansen, Bainbridge Island, WA (US); Eric Levi, Bainbridge Island, WA (US); Justin Chase Bothell, Poet Townsend, WA (US)

(73) Assignee: Ripelocker LLC, Bainbridge Island, WA (US)

( * ) Notice: Subject to any disclaimer, the term of this patent is extended or adjusted under 35 U.S.C. 154(b) by 245 days.

(21) Appl. No.: 15/923,529

(22) Filed: Mar. 16, 2018

Related U.S. Application Data

(60) Provisional application No. 62/472,284, filed on Mar. 16, 2017.

(51) Int. Cl.
| B65B 31/02 | (2006.01) |
| B65B 25/00 | (2006.01) |
| B65D 85/34 | (2006.01) |
| B65D 81/20 | (2006.01) |

(52) U.S. Cl.
CPC .......... B65B 31/025 (2013.01); B65B 25/001 (2013.01); B65D 81/2038 (2013.01); B65D 85/34 (2013.01)

(58) Field of Classification Search
CPC . B65B 31/025; B65B 25/001; B65D 81/2038; B65D 85/34
See application file for complete search history.

(56) References Cited

U.S. PATENT DOCUMENTS

| 3,085,913 A * | 4/1963 | Caswell | H01B 1/00 427/63 |
| 5,261,976 A * | 11/1993 | Schultz | C21D 1/76 148/508 |
| 8,783,002 B2 * | 7/2014 | Bowden | B65B 31/04 426/316 |

* cited by examiner

Primary Examiner — Regina M Yoo
(74) Attorney, Agent, or Firm — ÆON Law; Adam L. K. Philipp; Martin Spencer Garthwaite

(57) ABSTRACT

A system and method for storing perishable items under controlled atmospheric conditions is provided. Total atmospheric pressure within a vacuum chamber containing the perishable items is reduced to below a predetermined total pressure limit. Oxygen partial pressure within the chamber is monitored. When the Oxygen partial pressure falls below a predetermined lower Oxygen partial pressure limit, an Oxygen-containing gas is admitted to the vacuum chamber to raise the Oxygen partial pressure above the lower Oxygen partial pressure limit. Total atmospheric pressure within the chamber is also monitored. When the total atmospheric pressure reaches or exceed the predetermined total pressure limit, total pressure within the vacuum chamber is once again reduced below the predetermined total pressure limit.

6 Claims, 4 Drawing Sheets

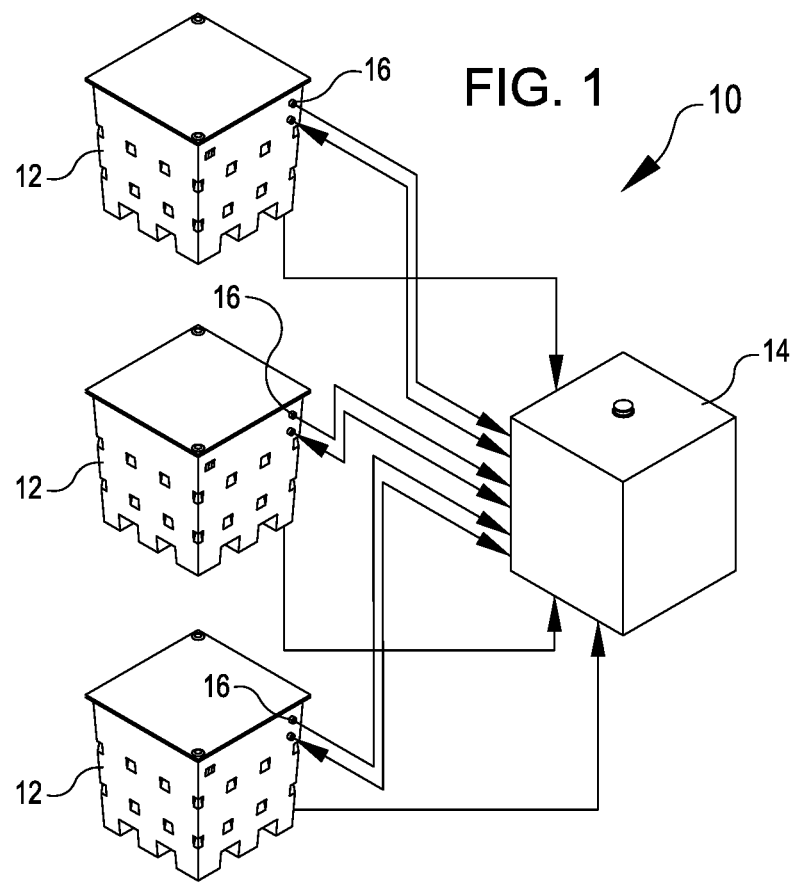

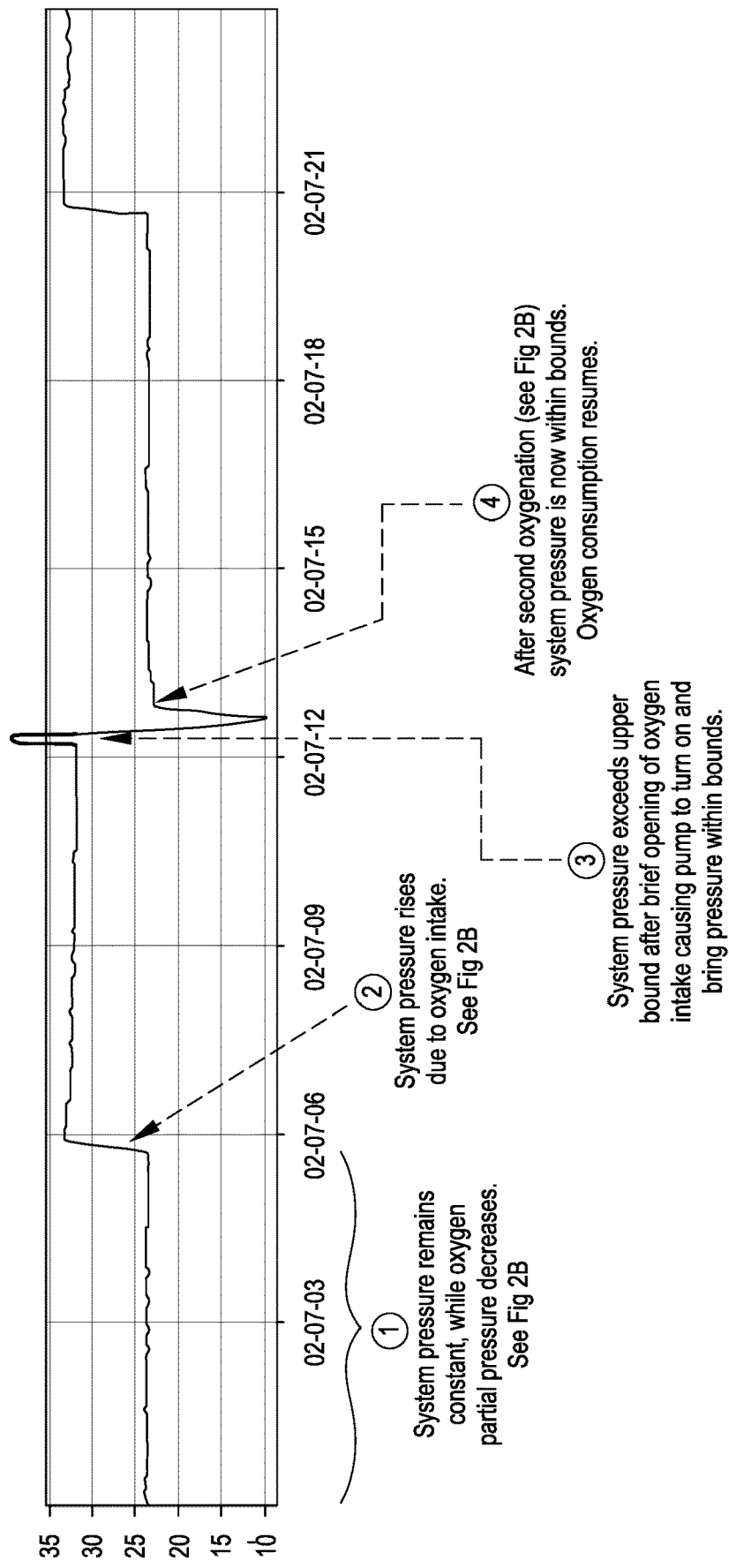

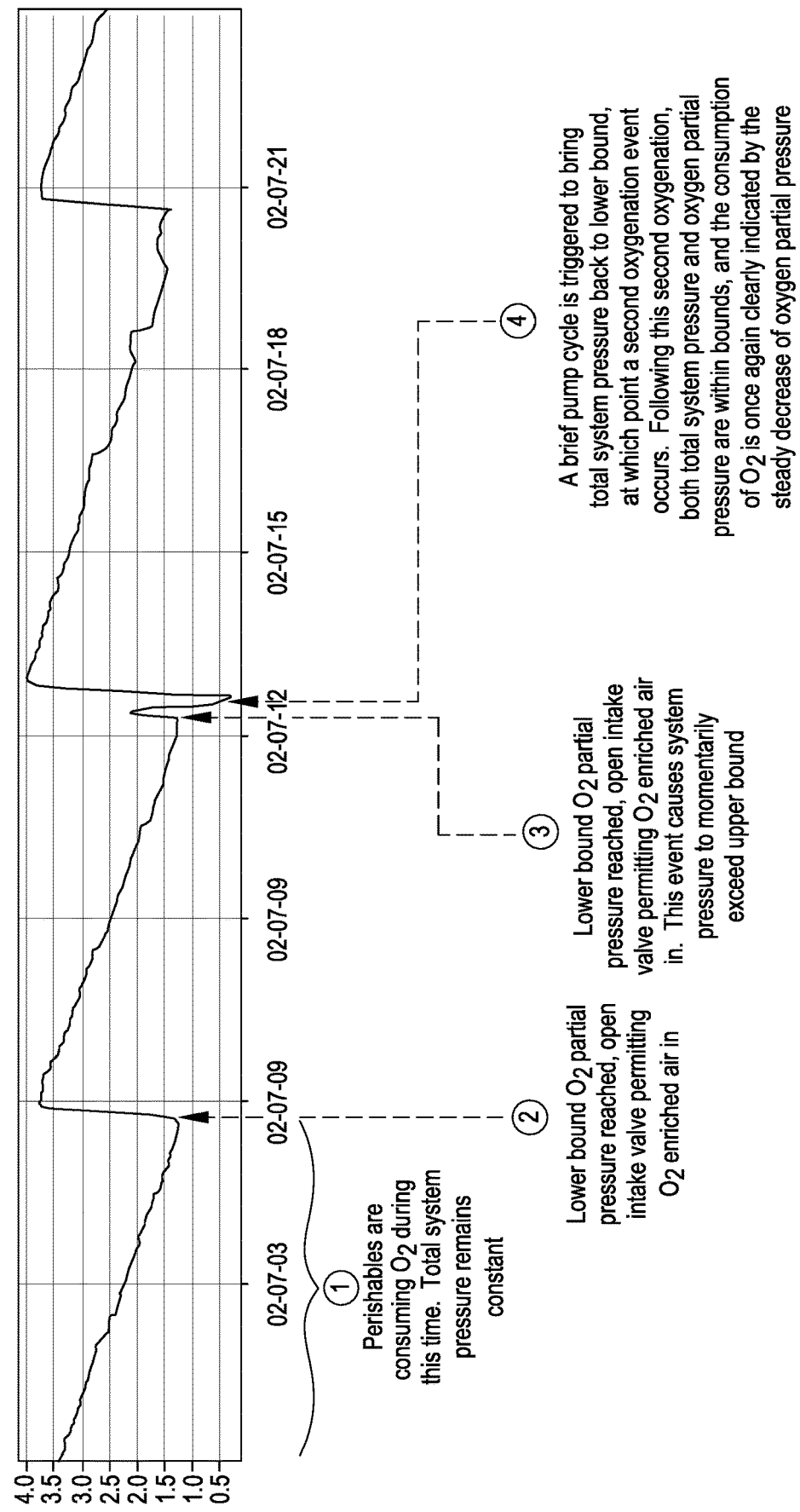

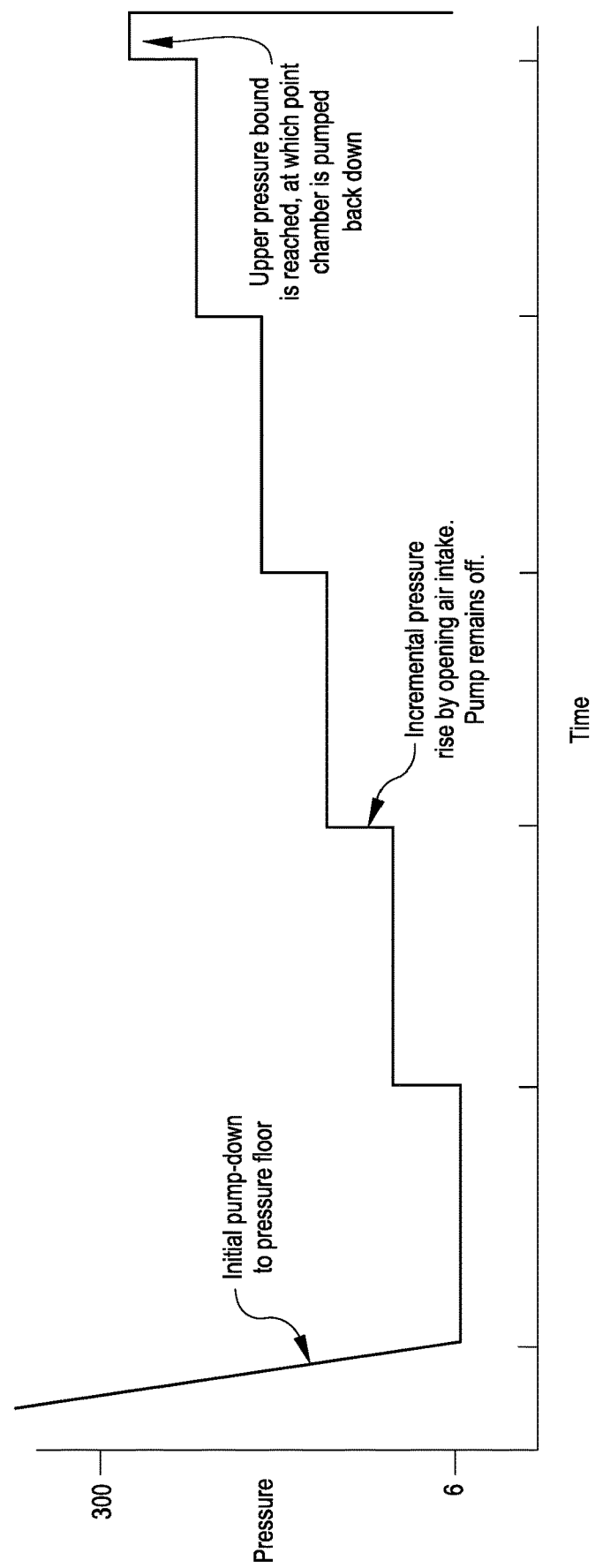

US 10,919,656 B1

PROCEDURES FOR OPERATING A VACUUM TO STORE PERISHABLES BY CONTROLLING PRESSURE AND OXYGEN LEVELS INDEPENDENT OF EACH OTHER AS WELL AS SETTING FLOOR AND CEILING OPERATING PARAMETERS

CROSS REFERENCE TO RELATED APPLICATIONS

This patent application claims the benefit of and priority to U.S. Provisional Patent Application Ser. No. 62/472,284 filed on Mar. 16, 2017, entitled, "Control System For Managing Environmental Conditions Inside A Vacuum Storage Container For Preserving Perishable Products," the disclosure of which is hereby incorporated by reference for all purposes.

FIELD OF THE INVENTION

The invention relates to systems, methods and apparatus for controlling environmental conditions within a sealed chamber for preserving perishable products.

BACKGROUND

It has been determined by Stanley P. Burg that by placing perishable items in vacuums under low pressure between approximately 10 to 150 Torr, in combination with refrigeration, the degradation or senescence of the perishable can be significantly slowed as compared to refrigeration alone. However, to date no attempt has been made to alter environmental conditions under vacuum other than to hold constant pressure which results in a constant oxygen percentage.

SUMMARY OF THE INVENTION

The invention is directed to apparatus, methods and control techniques for placing and keeping harvested fruits, vegetables and other perishable commodities in a vacuum environment from shortly after they are harvested until shortly before they are offered for retail sale. By setting and measuring pressure levels and oxygen levels independent of one another, oxygen can be controlled so as to avoid anaerobic respiration yet pressure can be reduced to the lowest number possible so as to derive the benefits of increased respiratory gas and volatile diffusion. By setting pressure and oxygen floors and ceilings the pump and air intakes associated with the vacuum system are only required to operate when the interior parameters fall outside the set ranges. This results in a reduced pump run time, the opportunity to do away with supplemental humidification, and for the opportunity for one vacuum pump to control multiple vacuums.

These and other features and advantages will be apparent from a reading of the following detailed description and a review of the associated drawings. It is to be understood that both the foregoing general description and the following detailed description are explanatory only and are not restrictive. Among other things, the various embodiments described herein may be embodied as methods, devices, or a combination thereof. The disclosure herein is, therefore, not to be taken in a limiting sense.

BRIEF DESCRIPTION OF THE FIGURES

FIG. 1 is a schematic view of a system for storing and transporting perishable products under vacuum conditions using a plurality of vacuum containers under the control of a master control and pump unit.

FIG. 2(a) is a graphical depiction of total pressure vs. time data showing pressure variations in a vacuum storage container operated in accordance with one aspect of the methods disclosed herein.

FIG. 2(b) is a graphical depiction of Oxygen partial pressure vs. time data showing Oxygen pressure variations in a vacuum storage container operated in accordance with another aspect of the methods disclosed herein.

FIG. 3 is a graphical depiction of total system pressure vs. time data showing pressure variations in a vacuum storage container operated in accordance with another aspect of the methods disclosed herein.

DETAILED DESCRIPTION

Various embodiments will be described in detail with reference to the drawings, wherein like reference numerals represent like parts and assemblies throughout the several views. Many details of certain embodiments of the disclosure are set forth in the following description and accompanying figures so as to provide a thorough understanding of the embodiments. Reference to various embodiments does not limit the scope of the claims attached hereto. Additionally, any examples set forth in this specification are not intended to be limiting and merely set forth some of the many possible embodiments for the appended claims.

FIG. 1 depicts in schematic form a system 10 for maintaining perishables in a reduced pressure, controlled atmosphere environment for purposes of maintaining freshness and avoiding spoilage. Such a system is described in co-pending application Ser. No. 15/294,554, entitled "SYSTEM AND METHOD FOR TRANSPORTING AND STORING POST-HARVEST FRUITS, VEGETABLES AND OTHER PERISHABLE COMMODITIES UNDER CONTROLLED ATMOSPHERIC CONDITIONS," filed Oct. 14, 2016, the specification of which is incorporated by reference herein.

As shown in FIG. 1, the system 10 includes one or more chambers 12 capable of withstanding a high vacuum within and arranged to contain the perishable item(s). Each of the containers is coupled to a control unit 14 that includes a number of devices, such as vacuum pumps, temperature sensors, pressure sensors, Oxygen sensors and humidity sensors, for monitoring such parameters within the containers as pressure, humidity, gas concentrations, etc. These devices communicate with the chambers via one or more apertures 16 in the containers.

In accordance with one aspect of the invention, a control system is included in the control unit 14 for controlling atmospheric parameters according to protocols that, in accordance with another aspect of the invention, optimize energy efficiency, reduced senescence, and allocation of available resources.

The control system disclosed herein manages environmental conditions inside the vacuum storage chambers to maintain optimal conditions for preserving perishable products. The control system comprises one or a plurality of programmable logic controllers, vacuum pumps and intake valves with and without air enrichment membranes connected to the chambers either independently, or as a multi-chamber control system network to facilitate management of the environmental conditions inside the storage chambers. The control system includes the following:

1. Programmable logic controller (may include multiple processors for additional independent process control needs)—Programmable logic controller can control one or a plurality of chambers.

2. Vacuum pump—can control one or a plurality of chambers.

3. Sensors consisting of a) Oxygen; b) Temperature; c) Pressure, all for use with one or a plurality of chambers.

4. Valves—can control one or a plurality of chambers.

5. Oxygen enrichment technology consisting of a membrane at the air inlet which raises oxygen levels above relative atmospheric concentration levels, or the system can be connected to oxygen storage containers. A separate embodiment of the control system facilitates a more cost-effective approach leveraging a manifold in which a set of common valves may communicate with the pump, oxygen membrane, vent and sensors. These, via logic in the control system would be opened along with a specific chamber valve when a specific event is required e.g. pumping or oxygenation on that specific chamber.

6. Control system which can be controlled via a connected network (Wi-Fi, cellular, Nodal etc.) or a programmable logic controller supported by an algorithm which does away with the requirement to be networked. During normal operation, as events transpire, the control system will need to service multiple chambers. Chambers will be prioritized with their respective needs and serviced accordingly in order of priority, and separately from each other.

7. Manifold of solenoids communicating with each other, including three common—oxygenation, vacuum pump, and vent along with a solenoid for each vacuum controlled by a common control system.

8. Accumulator tank and valve—A separate embodiment could include the use of an accumulator tank to facilitate "rapid" pump-down of the system or otherwise as a vacuum storage vessel to assist in servicing chambers as they need to be pumped down while improving use-efficiency of the pump in a multi chamber or even single chamber system. Vacuum would be "stored" in the accumulator to be used to help pump down chambers at a future point in time.

| Parameters monitored | Parameters that are controlled |
|---|---|
| Oxygen partial pressure | Pressure |
| Humidity | Oxygen |
| Total system pressure | |
| Chamber outside temperature | |
| Chamber commodity temperature | |

The programmable logic controller connects to the sensors, valves, and pump(s) to complete a control network to manage the independent vacuums. System pressure and, oxygen levels are maintained within a floor and ceiling independent of each other. Temperature, and humidity are monitored. To this end, the pump and/or intake only operate when the pressure and/or oxygen levels fall outside the floor and/or ceiling. Under certain conditions, if the management system does not account for temperature, normal reduction in pressure during a pump-down cycle in the system may be sluggish or not proceed at all do to water vapor-pressure constraints which would allow any liquid water to enter a gas phase-change drastically reducing pumping efficiency. Under these conditions the system will compensate and adjust the floor of the operational range of the chamber pressure control parameters to prevent continous pump operation. Capturing historical operating data for specific perishables allows for the opportunity to build predictive algorithms as to how the vacuums should operate, potentially doing away with the networked system and/or sensor feedback system.

The vacuum pump facilitates the pump down of the vacuum system to maintain the pressure of the chamber(s) within their floor and ceiling pressure set points. With the management system monitoring and maintaining oxygen in the chambers within their own floor and ceiling set points, the vacuum pump does not need to run continuously for a particular chamber(s).

The sensors utilized provide feedback directly to the programmable logic controller indicating operational conditions inside the chamber(s). Separate valves in the system allow for the in-flow of normal air or oxygen enriched air via the membrane, allowing air to be pumped out of the vacuum, and finally for the system to re-pressurize to atmospheric levels for loading/unloading etc. of the vacuum chamber(s).

An alternative embodiment utilizes the independent control of pressure and oxygen combined with pumping the hypobaric vessel to a low-pressure floor and slowly leaking normal air or oxygen enriched air into the vessel at a very low rate allowing the perishable to consume oxygen. The rate at which the oxygen is added to the system controls the respiration rate of the commodity stored within and is limited to an amount, just enough to keep the commodity from suffering anaerobic damage. At a given pressure ceiling the chamber is pumped back to its lower pressure threshold and the controlled oxygen leak-up cycle is repeated. This limits pumping time while sustaining a low pressure that assists in the diffusion of respiratory gasses and volatiles. This process also limits commodity water loss by retaining the water vapor within the chamber.

In accordance with another aspect of the invention, a process for "flushing" the vacuums is provided. As the perishable items undergo senescence they produce gases and volatiles. These gases and volatiles build up inside the chamber and may cause harm to the perishables. The vacuum pump can be set to operate at a certain interval regardless of whether or not pressure is within the set floor and ceiling, so as to evacuate the chamber of these harmful gases and volatiles.

In accordance with still another aspect of the invention, the pressure is allowed to rise above what is historically considered low pressure for example up to 300 Torr. The purpose for this is to relieve the chamber of material "creep" to the structure which can result in catastrophic failure of the vacuum container. Even though the pressure is allowed to rise oxygen can be controlled independently so as to keep between the targeted floor and ceiling.

In accordance with still another aspect of the invention, a manifold with multiple solenoids is provided which includes three common solenoids (pump, O2 membrane, vent), along with a solenoid for each individual chamber in a system of multiple chambers to be communicating with a common control system.

Temperature is monitored outside the chamber as well as inside the chamber. Temperature measurements are utilized for alert-based indications.

Operating Protocols:

1. System Pressure—The pump will activate to bring down the pressure to its lower bound of the two pressure-control set-points. Any other operations for maintaining oxygen level are bypassed if pressure reaches the upper bound trigger point . . . . This means, that the oxygen membrane will not be allowed to flow oxygen-enriched air into the chamber if the pump is running (or, if in a multi-chamber, single pump system, a pump down valve may be opened or closed to control pump down) for any reason .... Once the low threshold is met of the total system pressure, oxygen membrane control resumes. In addition the pump could be set to run at certain intervals so as to evacuate gaseous mixtures from the chamber regardless of whether or not system pressure is within the set floor and ceiling.

2. Oxygen control—The air intake valve allowing the in-flow of normal air or oxygen enriched air via the membrane is triggered on/off by upper and lower bound limits of oxygen partial pressure. The oxygen concentration is measured continuously and if oxygen levels are low enough to allow the oxygen membrane to remain triggered all the way through the upper limit of total system pressure, the vacuum pump will be turned back on to bring total system pressure to its lower limit. Oxygen membrane will be closed during the pump-down process.

3. Sensor reduction for multi-chamber control—Rather than measuring oxygen at each chamber with a separate sensor, the system may incorporate one oxygen sensor at the manifold block and periodically pump a designated chamber down for several seconds allowing accurate oxygen readings for each chamber while still using a single oxygen sensor.

4. Chamber re-pressurization valve—manually controlled to re-pressurize vacuums.

The above-described operating protocols can be understood with reference to FIGS. 2-3.

As illustrated in FIG. 2A, the total pressure within the chamber has initially been reduced to approximately 24 Torr. As illustrated in FIG. 2B, the initial Oxygen partial pressure is approximately 3.5 Torr. No further action is taken, and the perishable item contained within the chamber respires at these atmospheric conditions. As respiration continues, the Oxygen partial pressure drops as the perishable item consumes Oxygen.

When the Oxygen partial pressure drops to a predetermined limit, such as approximately 1.25 Torr as illustrated in FIG. 2B, the intake valve to the chamber is opened, thereby permitting Oxygen enriched air into the chamber. This has the effect of causing the total pressure within the chamber to rise to a predetermined upper limit, such as approximately 32.5 Torr, at which point the intake valve to the chamber is closed. As illustrated in FIG. 2B, this has the effect of increasing the Oxygen partial pressure to approximately 3.75 Torr. Again, no further action is taken, and the perishable item contained within the chamber respires at these atmospheric conditions. Again, as respiration continues, the Oxygen partial pressure drops as the perishable item consumes Oxygen. This cycle repeats as the perishable item is stored, as further illustrated in FIGS. 2A and 2B.

As further illustrated in FIG. 2A, when the intake valve to the chamber is opened to admit Oxygen enriched air, the total pressure in the chamber can, and likely will, momentarily exceed the upper pressure limit or bound set for storage of the perishable item. A brief pump cycle is then triggered to bring the total system pressure back to the lower bound, at which point a second oxygenation event occurs. Following this second event, both total system pressure and Oxygen partial pressure are within the predetermined bounds, and the consumption of Oxygen is again indicated by the steady decrease of Oxygen partial pressure.

Another method of regulating Oxygen partial pressure within the chamber is shown in FIG. 3. As illustrated, after the initial evacuation of the vacuum chamber, wherein the Oxygen partial pressure is reduced to approximately 3.5 Torr, the intake valve to the chamber is opened at predetermined intervals, that may or may not be of equal length, to admit either atmospheric or Oxygen enriched air into the chamber. The total system pressure thus increases in regular steps until it rises to a predetermined upper pressure bound, at which time the vacuum pump is operated to reduce pressure within the chamber to the desired atmospheric conditions.

Although particular pressures, times, etc, have been disclosed for illustrative purposes, it will be appreciated that these specific parameters do not limit the invention in its broader aspects.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A method for storing a perishable item under controlled atmospheric conditions comprising: with respect to a vacuum chamber for containing the perishable item, reducing total atmospheric pressure in the vacuum chamber to below a predetermined upper total pressure limit; monitoring oxygen partial pressure within the vacuum chamber; admitting an oxygen-containing gas into the vacuum chamber when oxygen partial pressure within the vacuum chamber falls below a predetermined lower oxygen partial pressure limit; and reducing the total atmospheric pressure in the vacuum chamber at predetermined intervals to at least partially flush the vacuum chamber of accumulated gases and volatiles within the vacuum chamber.

2. The method of claim 1, wherein admitting the oxygen-containing gas into the vacuum chamber further comprises admitting the oxygen-containing gas until the oxygen partial pressure within the vacuum chamber rises to a predetermined upper oxygen partial pressure limit greater than the predetermined lower oxygen partial pressure limit.

3. The method of claim 2, further comprising monitoring total atmospheric pressure within the vacuum chamber and reducing the total atmospheric pressure within the vacuum chamber if and when the total atmospheric pressure within the vacuum chamber rises above the predetermined upper total pressure limit.

4. The method of claim 1, wherein the oxygen-containing gas is air.

5. The method of claim 1, wherein the oxygen-containing gas is oxygen enriched air.

6. The method of claim 1, further comprising monitoring temperature within the vacuum chamber and maintaining said temperature within predetermined limits.

\* \* \* \* \*